United States Patent [19]

Underberg

[11] 4,082,466
[45] Apr. 4, 1978

[54] OPTICAL SIGHTING INSTRUMENT

[75] Inventor: Robert L. Underberg, Mequon, Wis.

[73] Assignee: Realist, Inc., Menomonee Falls, Wis.

[21] Appl. No.: 695,764

[22] Filed: Jun. 14, 1976

[51] Int. Cl.² .............................................. G01C 5/02
[52] U.S. Cl. .................................... 356/249; 33/291; 33/292
[58] Field of Search ....................... 33/290, 291, 292; 356/249, 251

[56] References Cited

U.S. PATENT DOCUMENTS 2,731,873  1/1956  Churgin et al. ..................... 356/249

FOREIGN PATENT DOCUMENTS 183,967  12/1955  Austria .................................. 33/292
778,348   3/1935  France ................................ 356/249
192,688  12/1907  Germany ............................ 356/249

Primary Examiner—John K. Corbin
Assistant Examiner—Matthew W. Koren
Attorney, Agent, or Firm—Michael, Best & Friedrich

[57] ABSTRACT

The optical sighting instrument uses the image of a floating bubble in a spirit level as a self-compensating index mark to indicate a reference line of sight at a given angle to the earth's normal surface.

7 Claims, 7 Drawing Figures

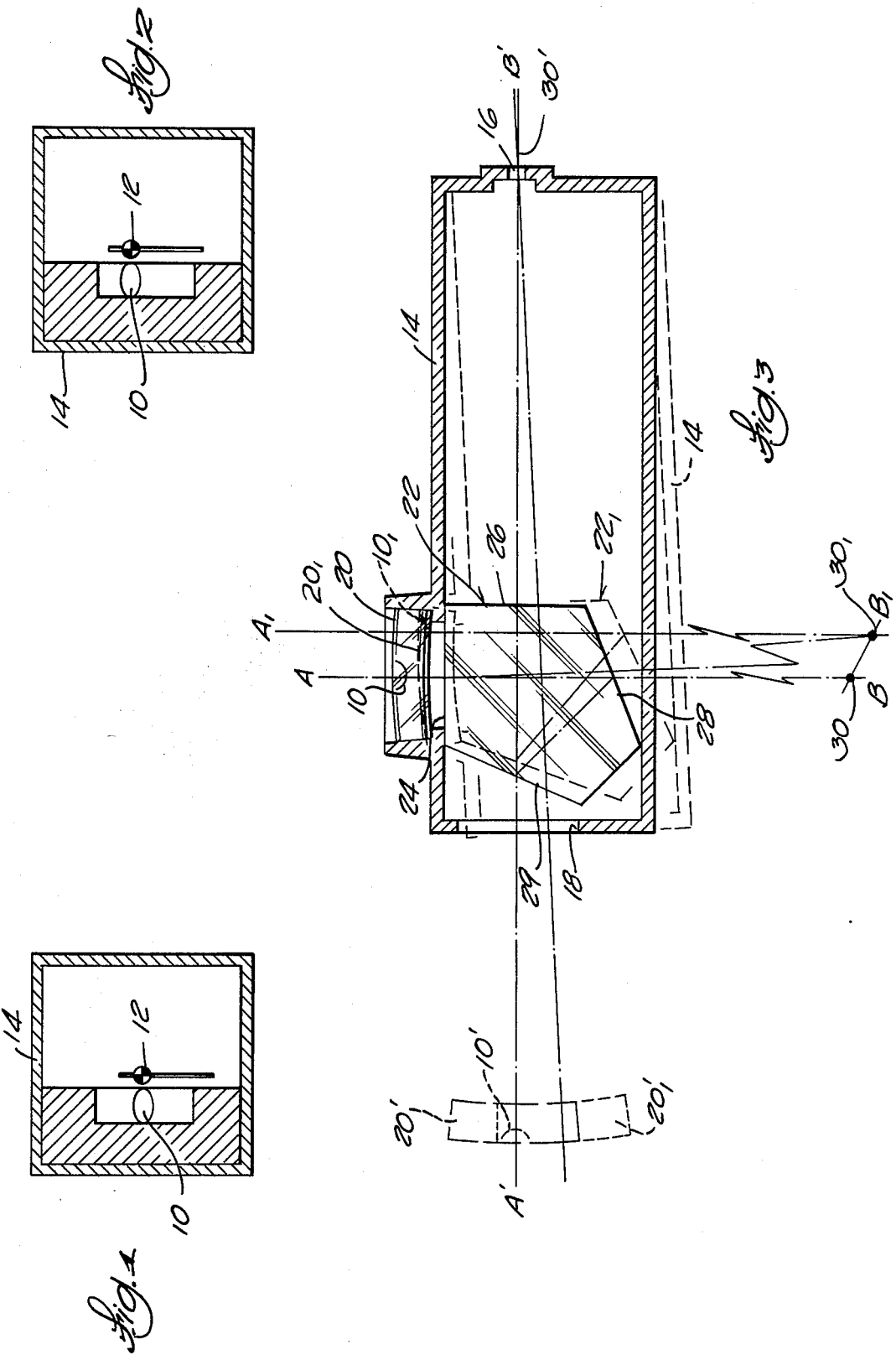

OPTICAL SIGHTING INSTRUMENT

BACKGROUND OF THE INVENTION

Automatic levels are well known in the construction industry. They are tripod mounted surveying instruments that need not be precisely leveled to obtain a precise level line of sight, and temperature changes or ground settling which would throw ordinary levels out of level are of no consequence to an "automatic". However, these instruments are rather costly and delicate. The compensators used have relatively heavy gravity sensing devices made up of a system of prisms and/or mirrors which are suspended by fine wires or frictionless high quality ball bearings. These devices also require close fitting damping devices to stabilize the delicately hung optics. The compensators in use today correct the line of sight by deflecting the target image relative to a fixed crosshair type index line.

To date no one has come up with a simple, low cost, rugged compensator which can be used on inexpensive low power and relatively lower precision instruments such as a hand level. A hand level is a hand held sighting instrument, usually of unit power, used to establish a horizontal or level reference line of sight. Hand levels in common use today are of the "Locke" type which is basically an open tube with a flat cover glass at the objective end and a peep sight at the eye end. A spirit level is mounted over a slot on the upper side of the tube, a crosswire is mounted centered below the spirit level crosswise to the slot and a right angle prism is mounted in the tube below the spirit level and crosswire to reflect an image of the level and the crosswire toward the eye end. A convex lens which has been diametrically cut in half is mounted in the tube between the prism and the peep sight so that the lens is not being used when the target area is being viewed but the lens is used when the spirit level and the crosswire are being viewed. When sighting through the peep sight, part of the field of view is an open sight to the target area and immediately adjacent to it and visible at the same time is a sharply focused view of the image of the spirit level and the crosswire. Using the hand level requires that the instrument be aimed at the target so that the target is seen in the open sight portion of the instrument near the bubble image. The instrument is then leveled by tipping it until the crosswire exactly bisects the bubble. While holding the instrument level, the end of the crosswire is used as the index to obtain the level reading on the target being viewed.

Some Locke type hand levels incorporate Galilean telescopes to magnify the target about two to three times for better discrimination. The Abney level is similar to the Locke type and is used the same way for leveling. In the Abney level the spirit level is pivotally mounted above the sighting tube by means of a support having a graduated arc. To measure or set a grade, the spirit level is rotated to an angle or percent grade as defined by the graduated arc and then the instrument is sighted normally. When the bubble bisects the crosswire the line of sight of the instrument is inclined to the horizontal to the amount set.

Some tilting levels utilize the principle of viewing the target area and the spirit level simultaneously through a common eyepiece. These instruments use erecting type telescopes with a crosshair type reticle in the target viewing area and are usually in 28X magnification area for extremely accurate work. The optical train used to view the bubble is complicated and the bubble is split lengthwise optically, and one end of the bubble is reversed and brought in line with the other end of the bubble. This is called a coincidence type bubble and in use the instrument is set up on a tripod or other firm support and the telescope is fine leveled by means of a micrometer type knob. When the two images of the opposite ends of the bubble are in coincidence, the instrument is level and the level reading is made utilizing the crosshairs.

SUMMARY OF THE INVENTION

An object of the invention is to provide a simple, rugged, reliable, and low cost compensating device that can be used on the grade of instruments affordable by the small contractor, builder, and property owner.

The invention utilizes the motion of the gas bubble in a common spirit level as it seeks the highest point in its circular curved tube as the sole moving member in an automatic level compensator. The bubble itself now becomes the self-aligning index mark in the field of view of the instrument. The spirit level bubble is visible with the target simultaneously through a common eye aperture and the bubble aligns itself with the level point on the target. The viscosity of the fluid used in spirit levels makes them self damping and, since they have no mechanical parts to wear, they are ultimately reliable. In the size and sensitivity required for the grade of instrument now considered, they are low cost and when properly mounted they are rugged.

The requirements of the invention make it uniquely adaptable to hand levels and hand held instruments have a particular need for automatic level compensation. One of the preferred embodiments of the invention is a modification of the Locke type hand level of unit magnification. In this embodiment a pentaprism replaces the right angle prism to reflect the image of the spirit level toward the eye. The crosswire is not needed and is omitted. The double reflection of the pentaprism is required to make the bubble image move in the proper direction relative to the direction of instrument tilt. In order that the bubble image indicates a level line of sight, the output rays from the pentaprism must be perpendicular to the input rays, hence, the mirrored reflecting faces of the pentaprism are at 45° to each other. The amount of bubble image motion must be synchronized with the tilt of the instrument so that the compensation will be the correct amount. In the preferred embodiment this is accomplished by making the effective center of curvature of the vertical image of the spirit level tube (after refraction by the glass in the pentaprism and the semicircular lens) coincide with the center of the eye aperture at the eye end of the instrument.

In use the instrument need be held only approximately level and the operator can devote his complete attention to making the reading, thus saving time, decreasing chance of error, and reducing operator skill.

The invention can be applied to an Abney type hand level by using a system with two mirrors instead of a pentaprism and making one of the mirrors adjustable by an external means so that the angle between them can be changed from the 45° position. The line of sight through the bubble image will move through an angle that is twice as great as the angular mirror movement. Alternatively, the sighting aperture can be moved vertically or the bubble tube can be moved in a fore and aft direction so that the center of curvature of the virtual image of the spirit level falls above or below the center of the sighting aperture.

The invention can be applied to a hand level in which the target viewing section has a magnifying power greater than unity. In such an arrangement the total effective path distance between the bubble and the sighting aperture or exit pupil is shorter than the radius of curvature of the spirit level tube, the ratio between the two lengths being numerically equal to the linear power of the telescope.

DESCRIPTION OF THE DRAWINGS

FIG. 1 is a view as seen through the sighting aperture of an embodiment of the invention as it is held level.

FIG. 2 is similar to FIG. 1 except that the objective end is tilted down slightly.

FIG. 3 is a schematic drawing illustrating the optical system in a sighting instrument as it is held level and as tilted.

DESCRIPTION OF THE PREFERRED EMBODIMENTS

Figure 7:
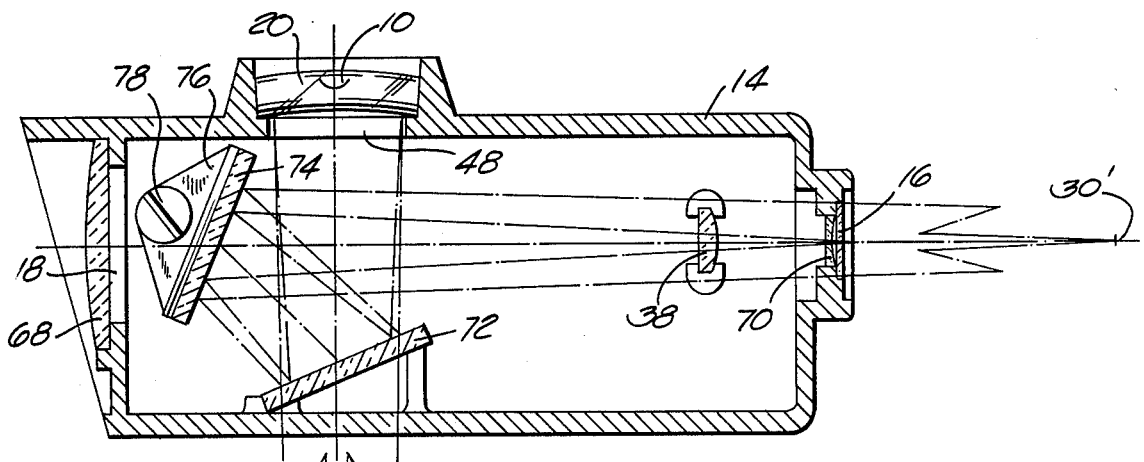
FIG. 7 is a longitudinal sectional drawing illustrating an embodiment of the invention in an automatic level compensating hand level having magnifying power.

In the present invention the view as seen through a level instrument is illustrated in FIG. 1. There is no crosswire and the image of the bubble 10 is used as the index mark and lines up with the level target 12. The image of the bubble has been reduced in size to facilitate the reading. FIG. 2 illustrates what happens when the instrument of the present invention is tilted down as shown by the relative positions of the center of the instrument and the stationary leveling rod target 12. The image of the bubble 10 has now moved up an exact compensating distance and it continues to indicate the level line of sight as shown by its continued alignment with the target. This represents a great simplification in the use of hand levels.

In FIG. 3 the basic principle is applied to a basic hand level. The initial position of the instrument is shown in solid lines. The sighting tube 14 has a viewing aperture 16 at the eye end and an objective aperture 18 at the target end. On the upper portion of this tube is mounted a spirit level 20 having a floating bubble 10 which indicates the highest point in the arc of its curved glass tube. Below the spirit level is mounted a pentaprism 22. This prism has five sides. The entrance side 24 and the exit side 26 are polished and are substantially perpendicular to the normal entering and the exiting light rays. The two reflecting sides 28 and 29 are also polished and are coated with a highly reflective material. Pentaprisms are particularly noted for their property that any ray transmitted by the useful aperture is deviated by a constant angle regardless of the orientation of the prism. In this case the angular relationship between the reflecting faces 28 and 29 is 45° which geometrically makes the angle of deviation exactly perpendicular. The virtual image 20' of the spirit level 20 is shown in dashed lines. The virtual image of the effective center of curvature of the spirit level is at 30' which coincides with the center of the small sighting aperture 16. Line AB, which passes through the center of the bubble 10 and the center of curvature of the spirit level 20, is an exact vertical line and the line of sight A'B', which passes through the center of the small sighting aperture 16 which is also the virtual image of the effective center of curvature of the spirit level, is an exact horizontal line.

In dotted lines in FIG. 3 a typical tipped position of the instrument is illustrated. The center of rotation of the tip is at the center of the sighting aperture as would be the case when the instrument is actually used. The subscript $_1$ is added to the original reference numbers to identify the same components in the tipped position, thus spirit level 20 moves to $20_1$ and the virtual image of the level tube 20' moves to $20_1'$. Since the bubble 10 in the spirit level 20 is free to move as it will, it assumes a position at $10_1$ which is directly above its center of curvature $30_1$ and the line $A_1B_1$, which passes through the center of curvature $30_1$, is a true vertical line. Since the center of rotation was made effectively at point 30, the "new" point 30 will remain the same. Since line $A_1B_1$ passing through point $30_1$ is a true vertical and it is deviated by the pentaprism $22_1$, the line A'B' is a true horizontal. Since point 30 remains fixed, it follows that the true level line A'B' is common to any angle of tilt of the sighting tube.

When a light ray enters a prism obliquely to its surface, a refraction takes place which deviates the direction of the ray. For simplicity this effect is not shown on the illustration. In this embodiment the effect is minor. The deviation at the entrance face is exactly offset by the deviation at the exit face and the principle of the invention is not affected. It should be understood that the pentaprism can be replaced by two plane mirrors disposed at 45° to each other in which case no refraction would take place and then the effective radius of curvature would be the actual radius of curvature. It should be further understood that the optical effect of two plane mirrors can be duplicated by any even number of reflections such as four, six, eight, etc. and an embodiment employing that many reflections could be useful in a sighting instrument employing a sensitive spirit level having a very long radius of curvature.

For reasons of simplicity the semicircular convex lens common to hand levels in the art has not been considered. In practice, a segment of a lens is employed to collimate the image rays from the bubble to the eye so that the image of the bubble appears to the eye to be at a considerable distance in front of the instrument. This allows the user to comfortably view both the target and the spirit level simultaneously.

Figure 4:
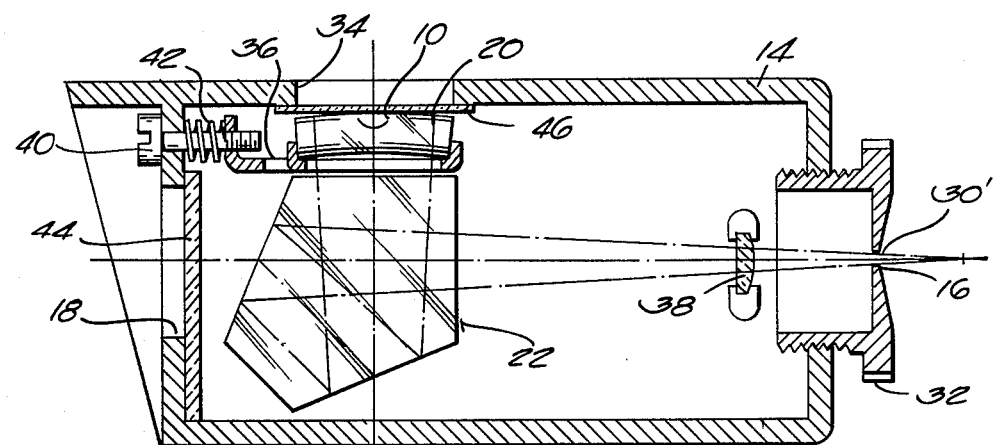
FIG. 4 is a longitudinal sectional drawing illustrating the arrangement of a preferred embodiment of a hand level.

The lens segment is incorporated in FIG. 4 in which the sighting tube 14 has an objective aperture 18 at the target end and an eyepiece 32 having a viewing aperture 16 assembled to the eye end. The upper surface of the sight tube has an elongated opening 34 which exposes a spirit level 20 to ambient light. The spirit level 20 is attached to a carrier 36 which, in turn, is movably mounted to the sighting tube. Below the level tube a pentaprism 22 is mounted in the sighting tube. Light rays from the bubble are reflected by the pentaprism toward the eyepiece passing first through a semicircular lens segment 38. An adjustment is provided consisting of the spirit level carrier 36, an adjusting screw 40, and a tension spring 42 which allows the spirit level to be critically adjusted in a fore and aft direction relative to the pentaprism. The adjustment, in effect, positions the virtual image of the effective center of curvature of the spirit level vertically in relation to the sighting aperture and visually adjusts the bubble image to be exactly on the horizontal line of sight. The eyepiece 32 is threaded into the sight tube 14 so the small sighting aperture can be adjusted laterally to position it exactly in the plane of the virtual image of the effective center of curvature of the spirit level. The visual effect of this adjustment is to keep the bubble image stationary with respect to the horizontal as the hand level is tilted up and down within the range of the spirit level. These adjustments are necessary because of practical considerations in the manufacture of components especially variations in the radius of curvature of the spirit level, slight tilts in the mounting of the spirit level, and tolerances in the mirror angles and the focal length of the semicircular lens segment. The target viewing portion of the illustrated embodiment is a simple open sight consisting only of the sighting aperture 16 and the objective aperture 18. Transparent covers 44, 46 are provided over the objective aperture and the spirit level aperture to keep dirt out of the interior of the instrument.

Figure 5:
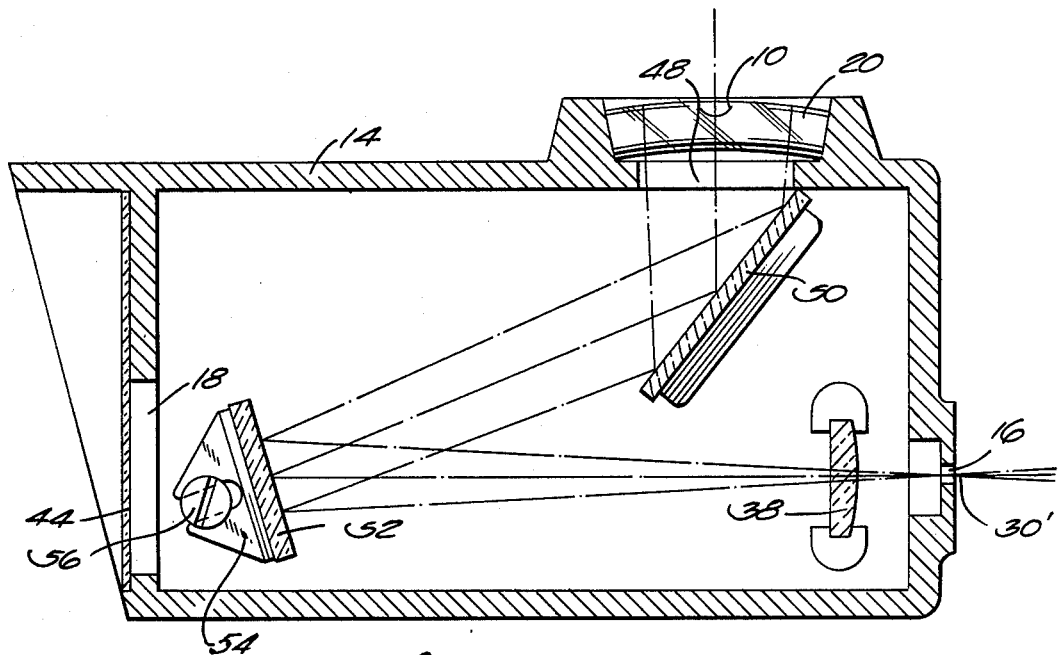
FIG. 5 is a longitudinal sectional drawing illustrating an alternate construction.

Persons skilled in the art can readily see alternative arrangements that may be less costly and have some other specific advantages. One such alternate arrangement is illustrated in FIG. 5. In this arrangement the spirit level 20 is solidly mounted in its aperture 48 providing its own cover. Ambient light from above passing through the spirit level impinges on fixed mirror 50 and is reflected forward to an adjustable mirror 52 mounted in the tube by means of a bracket 54. The light is then reflected back toward the small sighting aperture 16 passing first through the semicircular lens segment. In this configuration both the level adjustment and the tracking adjustments are combined. The pivotal motion of the mirror 52 and bracket 54 about the adjusting lock screw 56 will provide the level line adjustment and the elongated pivot hole in the mirror bracket 54 allows the mirror to be shifted fore and aft changing the length of the light path from the spirit level 20 to the sighting aperture 16, thus providing the tracking adjustment. As in the previous configuration, theoretically the two reflecting surfaces are 45° to each other. Since in this construction both the spirit level and the sighting aperture are fixed relative to each other, it is possible that when the pivotal mirror is adjusted to produce a horizontal line of sight the two mirrors may not be exactly 45° apart and the effective virtual image of the center of curvature of the spirit level may not be exactly on the center of the small sighting aperture. This is in the nature of compensating errors and, as a practical thing, it has no effect on the intended principle of this invention. As in the previous arrangement, the target viewing half of the hand level has no magnification and consists only of the sighting aperture 16 and the objective aperture 18 with its protecting cover 44.

Figure 6:
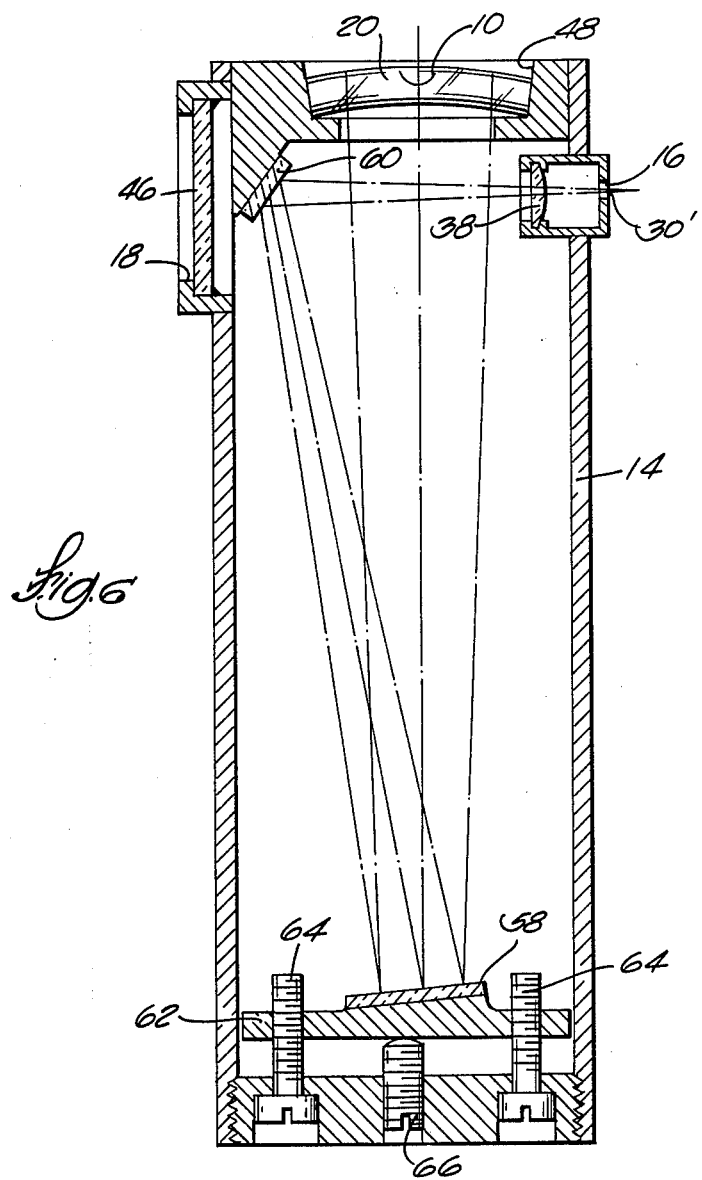
FIG. 6 is a longitudinal sectional drawing illustrating still another embodiment.

FIG. 6 illustrates another modification. This is a vertical configuration of a hand level and is especially suited for an instrument having a more sensitive spirit level with its longer radius of curvature. It consists of a sighting tube 14 having an objective aperture 18 at the target side and a small sighting aperture 16 at the eye side. A fixed spirit level 20 is mounted in an aperture 48 at the upper side. Ambient light passes through the spirit level and down to an adjustable mirror 58 mounted near the lower end of the tube. The light is reflected back up to a fixed mirror 60 and then rearward through the semicircular lens segment 38 and through the sighting aperture 16. The adjustable mirror 58 is attached to an adjustment bracket 62 which is positioned vertically and angularly by a push-pull arrangement of screws 64. A single center screw 66 acts as a pivot and the three tension screws 64 arranged around the center screw provide the tilting and locking means. As before, the object viewing portion of the instrument is a protected open sight.

FIG. 7 illustrates an embodiment of the invention as applied to a hand level having a magnification greater than unity. This embodiment consists of a sight tube 14 having an objective aperture 18 at the forward end, an eye aperture 16 at the rear, and a spirit level aperture 48 on the upper surface. The target sighting portion of this embodiment is a simple Galilean telescope of linear magnification. The objective lens 68 is mounted over the objective aperture 18 and the negative eye lens 70 is mounted in a recess just forward of the eye aperture 16. The indicating portion of the instrument consists of the spirit level 20 with its indicating gas bubble 10 mounted in the upper aperture 48 of the sighting tube 14 so that ambient light passing down through the spirit level impinges a fixed mirror 72 and is reflected forward to an adjustable mirror 74 which is disposed at substantially 45° to the fixed mirror. The light rays are then reflected back parallel to the optical axis where they pass through the semicircular lens segment 38 and the eye lens 70. These rays present a virtual image of the spirit level 20 at a distance in front of the instrument adjacent to the field of view of the sighting telescope. The image of the bubble appears to move up and down as the instrument is tilted up and down from the level position. The radius of curvature of the spirit level tube and the effective folded light path distance from the bubble tube to the eye aperture as modified by the refraction of the semicircular lens segment 38 and the eye lens 70 is in the same ratio as the linear magnification of the telescope. The mirror bracket 76 and the lock screw 78 cooperate to adjust the virtual image of the bubble 10 so that it constantly indicates the level line of sight.

I claim:

1. An optical sighting instrument comprising,
   a housing having a sighting aperture and an objective aperture,
   a tubular spirit level mounted on the housing with the transverse centerline of the bubble in the spirit level appearing longer than the centerline parallel to the level axis,
   a plurality of reflecting surfaces positioned relative to the level and to one another to reflect light passing through the level to the sighting aperture so the virtual image of the level appears intact in the view from the sighting aperture through the objective aperture and the transverse centerline of the bubble image itself indicates the desired position relative to horizontal regardless of tilt of the instrument and the bubble image moves in the direction indicative of instrument tilt.

2. An instrument according to claim 1 in which there are two reflecting surfaces at 45° to each other.

3. An instrument according to claim 2 including a pentaprism which includes the reflecting surfaces.

4. An instrument according to claim 1 in which the number of reflecting surfaces is a multiple of two.

5. An instrument according to claim 1 in which the spirit level is mounted in the top surface of the housing and the housing is apertured so ambient light is transmitted through the level.

6. An instrument according to claim 1 including a lens segment mounted in the housing to focus the virtual image of the spirit level in front of the instrument.

7. An instrument according to claim 6 including a telescopic lens arrangement in the housing for obtaining a magnified image of the target viewed from the sighting aperture through the objective aperture.

* * * * *